United States Patent [19]

Goldelius

[11] Patent Number: 4,534,420
[45] Date of Patent: Aug. 13, 1985

[54] ELECTRIC TOOL WITH TORQUE MONITOR

[75] Inventor: Rainer Goldelius, Idstein, Fed. Rep. of Germany

[73] Assignee: Black & Decker Inc., Newark, Del.

[21] Appl. No.: 436,766

[22] Filed: Oct. 26, 1982

[30] Foreign Application Priority Data

Oct. 28, 1981 [DE] Fed. Rep. of Germany ....... 3142682

[51] Int. Cl.$^3$ ............................................ B23Q 17/00
[52] U.S. Cl. .......................................... 173/12; 173/1; 73/862.29; 338/114
[58] Field of Search ............... 173/12, 1; 81/469, 467; 73/862.31, 862.29; 338/114; 318/488; 310/68 B

[56] References Cited

U.S. PATENT DOCUMENTS

| | | | |
|---|---|---|---|
| 3,386,067 | 5/1968 | Costanzo | 338/100 |
| 3,832,897 | 10/1974 | Schenck | 73/862.31 |
| 4,089,216 | 5/1978 | Elias | 73/862.31 |
| 4,188,821 | 2/1980 | Elias | 73/862.31 |
| 4,384,493 | 5/1983 | Grunbaum | 73/862.29 |

FOREIGN PATENT DOCUMENTS

| | | | |
|---|---|---|---|
| 2442260 | 6/1974 | Fed. Rep. of Germany | 81/323 |
| 2543455 | 1/1976 | Fed. Rep. of Germany | 338/71 |
| 2045385 | 3/1976 | Fed. Rep. of Germany | 338/71 |

*Primary Examiner*—Donald R. Schran
*Assistant Examiner*—James Wolfe
*Attorney, Agent, or Firm*—Ronald B. Sherer; Edward D. Murphy; Harold Weinstein

[57] ABSTRACT

An electric tool, especially a hand tool, is provided with a torque monitor. For this purpose the support bearings taking up the reaction torque of the electric motor in the housing of the tool are equipped with pressure sensors in the form of conductive plastic material, the electric resistance of which changes as a function of the pressure exerted.

9 Claims, 6 Drawing Figures

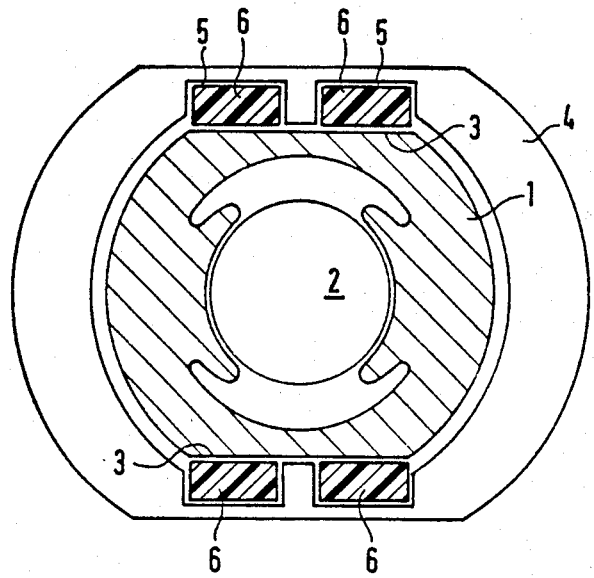
Fig. 1
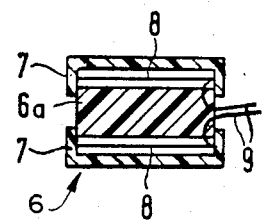
Fig. 3
Fig. 2
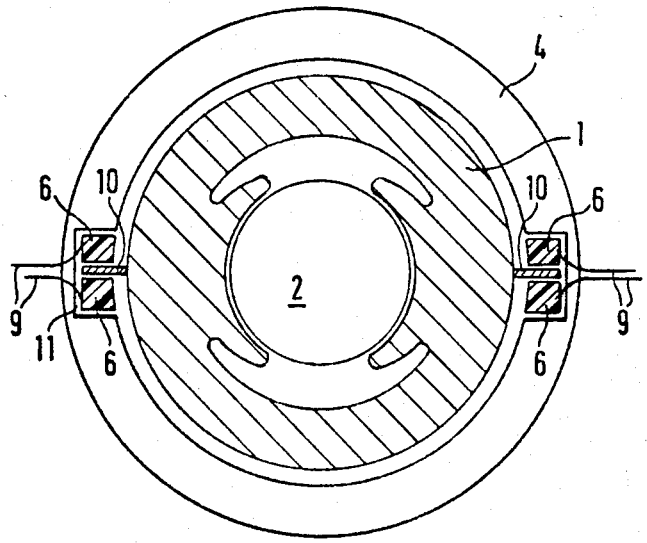

4,534,420

ELECTRIC TOOL WITH TORQUE MONITOR

FIELD OF THE INVENTION

The present invention relates to electric tools, especially hand tools, in general, and more particularly to the incorporation therein of a torque monitor for influencing the electric motor of the tool.

BACKGROUND OF THE INVENTION

In German Offlegungsschrift No. 2442260 is disclosed an electric tool in which the deformation of the handle relative to the housing is measured for monitoring and, optionally, for limiting the torque and, thereby, reducing the danger of accidents at the increasingly higher power and torque of such tools. The drive motor is controlled in dependence on the measured value. The tool uses, for obtaining the measurement value, strain gauges or piezo resistors which are preferably arranged in a region of reduced housing cross section. Determining the torque in this way has, for one, the disadvantage that strain gauge and piezoelectrically operating sensors provide only very small measurement values, the processing of which is complicated and subject to interference. Measuring the stress of the housing in the region of the handle means, in addition, that it is necessary to adapt the measuring pick-up, together with the circuit, to each housing design. In addition, there is the danger that the monitoring will not work if the tool, under special circumstances or due to negligence, is not gripped by the handle, or if accessories reduce or prevent the stress on the handle.

The present invention is concerned with solving these problems.

Pressure sensitive conductive plastic material which is also called "conductive plastic", is known in many variants. For instance, German Auslegungsschrift No. 25 43 455 discloses the use of silicone rubber mixed with metal particles or carbon dust for such material. The use of conductive plastic material as a pressure sensitive switch for overload protection is disclosed in German Patent No. 20 45 385. And, the use of such material as a continuously variable resistor for controlling the current drain of consuming devices, for instance, for controlling the speed of hand drills, is disclosed in U.S. Pat. No. 3,386,067.

SUMMARY OF THE INVENTION

It is an object of the present invention to provide an electric tool with a simple, reliable and sensitive torque monitor which can be employed universally.

A feature of the present invention by which this object is achieved is the employment of pressure sensitive conductive plastic material in one or more of the support bearings of the electric motor.

Accordingly, therefore, the present invention provides an electric tool having a housing with an electric motor mounted therein by support bearings, and a torque monitor having a measuring element for providing an output to influence the electric motor. The measuring element comprises at least one pressure sensor comprising electrically conductive plastic material, the resistance of the latter changing as a function of the pressure exerted upon it, and the measuring element is associated with at least one of the support bearings and is sensitive to the reaction torque of the electric motor in the housing.

Determining the torque at the electric drive motor itself enables the invention to be readily used in tools of different shape and type, for instance, in electric hand drills, hand saws, etc. The measurement values delivered by the pressure sensors are relatively large because the changes in electric resistance which the conductive plastic material exhibits are relatively large with pressure change, for instance, several powers of ten. Thus, the evaluating circuit can be simple and reliable. The pressure sensors themselves can be made rugged, reliable and have a long service life and, therefore, are suitable for the rough operation to which hand held electric tools may be subjected.

Various embodiments of the present invention are disclosed. The pressure sensors may comprise platelets of pressure sensitive conductive plastic material which are arranged, together with two electrodes, in an enclosure formed by two shells which are movable relative to each other. Instead of employing shells that are movable relative to each other, an elastic one-piece housing may be used.

The electric motor may advantageously have two oppositely disposed support bearings one or both of which contain two pressure sensors between which a pressure element is located, the pressure element being fastened to the motor and the pressure sensors being braced against the housing or vice versa. The two pressure sensors, each with one platelet of pressure sensitive conductive plastic material and two electrodes, can preferably be accommodated in a common casing which has an opening through which the pressure element passes. The pairs of pressure sensors are then present in the form of a handy and protected component.

If, according to a frequently used portable electric tool arrangement, the motor of the tool has two flats disposed opposite each other in cross section, a further embodiment of the present invention provides support bearings formed by at least one pressure sensor arranged between each flat of the motor and an adjacent wall of the housing. Preferably, two pressure sensors are provided for each flat, with the sensors disposed in recesses in the housing wall. If the motor tends to twist when loaded by the reaction torque, the support bearings, which are at the same time pressure sensors, are loaded by the then canted flats and deliver corresponding measurement values.

In the simplest case, any measuring circuit may be provided which measures the electric resistance of the pressure sensor. Preferably, however, to obtain an increase in sensitivity while at the same time reducing interference, four pressure sensors are connected in a bridge circuit in such a manner that for each direction of rotation of the motor the two pressure sensors acted upon in the same sense are disposed diagonally opposite each other in the bridge, the supply voltage of the bridge circuit being fed in at one bridge diagonal and the measurement voltage influencing the motor being taken off at the other bridge diagonal.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 1 is a schematic cross section of an electric motor with four pressure sensors for monitoring the torque according to the present invention;

FIG. 2 is a schematic cross section of an electric motor with a further embodiment of a torque monitor according to the present invention;

FIG. 3 is an enlarged cross-sectional view of the pressure sensor employed in the embodiments of FIGS. 1 and 2;

DETAILED DESCRIPTION OF THE PREFERRED EMBODIMENTS

Figure 4:
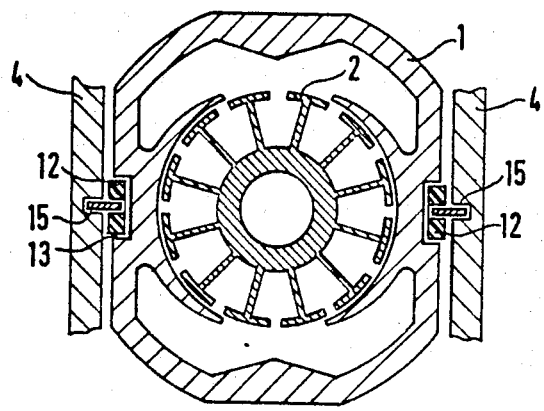
FIG. 4 is a schematic cross section of an electric motor with a third embodiment of a torque monitor according to the present invention.

FIG. 1 shows schematically an electric motor of a hand tool, for instance, an electric drill, having a stator 1 and a rotor 2 which are shown diagrammatically without windings and other details such as bearings, commutators, carbon brushes, leads, etc. The stator 1 has a cylindrical external shape with two flats 3 which form flat surfaces extending on the top and bottom side in the direction of the axis of rotation. The motor is supported in a plastic material tool housing 4, likewise shown only schematically, the shape of which is adapted to that of the stator 1.

Opposite the flats 3, the housing 4 has chamber-like cavities 5 in which pressure sensors 6 of rectangular cross section are disposed.

In FIG. 3 the pressure sensors are shown in greater detail. A platelet 6a made of pressure sensitive conductive plastic material is disposed between two half-shells 7 of insulating material which can be moved relative to each other. Between each half-shell 7 and the platelet 6a, an electrode 8 in the form of a metal foil or a metal platelet is arranged. Electrical conducting leads 9 lead from the electrodes 8 to the exterior of the sensor 6. In FIG. 3, the pressure sensor 6 is shown slightly pulled apart for better understanding. In operation, the shells 7 rest tightly against the platelet 6a with the interposition of the electrodes 8. The resistance measured between the electrodes 8 changes greatly with the pressure exerted on the shells 7, for instance, between 1 megohm in the pressureless state to 100 ohms at maximum pressure. The resistance range can be influenced by the choice of the pressure sensitive conductive plastic material as well as by the size and shape of the platelet 6a, and the size and shape of the electrode 8, and can be designed to a desired value. The pressure sensors 6 of FIG. 3 when placed in the cavities 5 become the support bearings for the stator 1 in the housing 6.

If the motor of FIG. 1 is loaded, the stator 1 attempts to turn relative to the housing 4 due to the reaction torque of the motor, and thereby its flats 3 exert pressure on the support bearings, i.e., on a pair of diagonally opposite pressure sensors 6. The resistance change resulting therefrom can be utilized in a subsequent circuit for limiting the torque, and optionally also for switching the motor off. Such circuits are known in the art and can be adapted or developed, depending on the desired properties, by an expert skilled in the art. If the direction of rotation is reversed, the other pair of pressure sensors 6 is acted upon.

Figure 6:
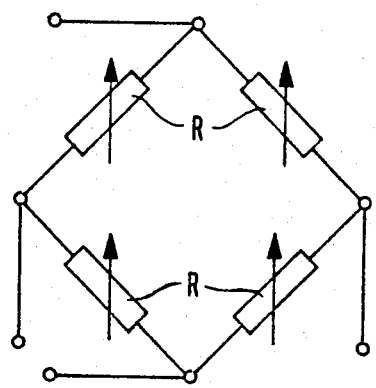
FIG. 6 is a circuit diagram of a measuring bridge circuit for use in the embodiments of the present invention.

Advantageously, the pressure sensors 6 are connected together to form a bridge circuit as shown in FIG. 6. The respective pressure sensitive resistors R which are disposed opposite each other in the motor, are also in diagonally opposite branches in the bridge circuit. In the usual manner, a supply voltage is applied to one bridge diagonal, and the other bridge diagonal furnishes the measurement voltage.

FIG. 2 shows a further embodiment of the present invention. The stator 1 and rotor 2 of the motor are designed in a manner similar to the embodiment shown in FIG. 1. However, the stator 1 has a cylindrical cross section without flats. The motor is braced with two pins or straps 10 which are attached to the stator 1, between pairs of pressure sensors 6 which may again be designed in accordance with FIG. 3 and are disposed in recesses 11 in the housing 4. Leads 9 lead to a measuring circuit which may again contain a bridge circuit according to FIG. 6. When the motor is loaded, two respective diagonally opposite pressure sensors 6 are stressed similarly to the embodiment according to FIG. 1, and the other sensors are load-relieved.

Figure 5:
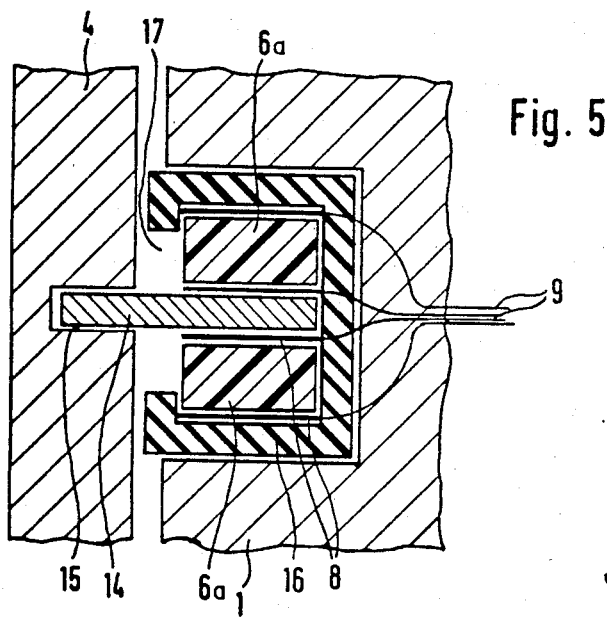
FIG. 5 is an enlarged view of the left-hand support bearing of the motor of FIG. 4.

The embodiment of the invention shown in FIG. 4 schematically shows a somewhat different electric motor which again has a stator 1 and a rotor 2. Here, too, the details of the motor have been omitted because they are not necessary for an understanding of the invention. The motor is supported in the housing 4, which is shown only schematically as parts of a wall, by means of support bearings which include pressure sensor pairs 12, the design of which is shown in detail in FIG. 5. Each pair 12 of pressure sensors represents an enclosed component which is disposed in a recess 13 in the stator 1, and is braced by a pressure element in the form of a plate 14 engaged in a slot 15 in the wall 4. As shown in FIG. 5, two platelets 6a of rectangular cross section and two pairs of electrodes 8 each are arranged in a casing or enclosure 16 consisting of insulating material. Between the two inner electrodes 8, the metal plate 14 is disposed as the pressure element which transmits the pressure to the platelets 6a of conductive plastic material. The plate 14 extends through a lateral opening 17 out of the casing 16 and is braced in the slot 15 in the wall 4. The operation of the embodiment according to FIGS. 4 and 5 is the same as previously described for the embodiments of FIGS. 1 and 2.

The above described embodiments, of course, are not to be construed as limiting the breadth of the present invention. Modifications, and other alternative constructions, will be apparent which are within the spirit and scope of the invention as defined in the appended claims.

What is claimed is:

1. An electric tool having an electric motor, said electric motor comprising:
   a housing:
   a stator mounted inside said housing;
   support means, inside said housing and extending between said housing and said stator, for supporting said stator in said housing and transmitting the reaction torque of said motor to said housing;
   a pressure sensor incorporated in said support means;
   said pressure sensor comprising a platelet of electrically conductive plastic material, the resistance of the latter changing as a function of the pressure exerted upon it, disposed between two electrodes;
   said pressure sensor being subjected to said reaction torque to change the resistance of said conductive plastic material, whereby said change in resistance of said conductive plastic material can be used in controlling said motor;

two such pressure sensors between which a support element is disposed, one of said support element and said pressure sensors being fastened to said stator, and the other connected to by said housing, whereby one of said pressure sensors is subject to the reaction torque of the motor in one direction of drive of the latter and the other of said pressure sensors is subject to the reaction torque of the motor in the opposite direction of drive of the latter; and said two pressure sensors are contained in a common enclosure, and wherein said support element protrudes outwardly through an opening in said enclosure.

2. An electric hand tool having an electric motor, said motor comprising:

a housing having an inside surface with, in cross section, two diametrically opposed flats;

a stator supported inside said housing and having two diametrically opposed flats disposed opposite those of said housing;

opposed cavities in the housing flats;

a pressure sensor located in each said cavity, each sensing element comprising a platelet of conductive plastic material the resistance of which varies in relation to the pressure applied thereto, and two electrodes between which said platelet is disposed;

the pressure sensors forming support bearings for supporting said stator in said housing and transmitting the reaction torque of said motor to said housing, said stator flats engaging said pressure sensors; and said pressure sensors being subjected to said reaction torque to change the resistance of said conductive plastic material, whereby the torque of said motor can be limited in dependence on resistance changes of said conductive plastic material.

3. The electric hand tool of claim 2, wherein there are two said cavities in each said housing flat, each cavity containing a separate said pressure sensor, said pressure sensors being disposed diametrically opposite each other in two pairs, one pair of pressure sensors being subjected to said reaction torque in one direction of rotation of said motor, and the other pair of pressure sensors being subjected to said reaction torque in the opposite direction of rotation of said motor.

4. The electric hand tool of claim 3, further comprising a bridge circuit comprising the two pairs of pressure sensors connected so that the pressure sensors of each pair are in diagonally opposite branches of the bridge circuit, supply voltage terminals for the bridge circuit coupled across one bridge diagonal, and terminals for taking off a measured voltage for controlling said motor coupled across the other bridge diagonal.

5. The electric hand tool of claim 3, wherein each said pressure sensor includes a pair of half shells of insulating material, each of said half shells housing one of said electrodes, and said half shells being movable relative to each other to transmit pressure through said electrodes to the platelet of conductive plastic material therebetween.

6. An electric tool having an electric motor, said motor comprising:

a housing;

a stator mounted inside said housing;

two oppositely disposed support bearings each connected to both said housing and said stator and extending therebetween inside said housing to support said stator in said housing and transmit reaction torque of said motor to said housing;

each support bearing comprising a member having opposite ends, one end being engaged in one of said housing and said stator and the other end engaging in a cavity in the other of said housing and said stator, said other end being sandwiched between a pair of pressure sensors contained in a casing of insulating material and having an opening therein, said member extending through said opening;

each pressure sensor comprising a pair of electrodes between which is disposed a platelet of conductive plastic material, the resistance of the latter changing as a function of the pressure exerted upon it; and said reaction torque being transmitted through said members, depending upon the direction of drive of said motor, to one pressure sensor of said pair of pressure sensors of each support bearing to change the resistance of the conductive plastic material thereof, whereby said motor can be controlled in dependence on this resistance change to limit the torque of said motor.

7. The electric tool of claim 6, wherein said cavities are disposed in said stator.

8. The electric tool of claim 6, wherein said cavities are disposed in an inner wall of said housing.

9. The electric tool of claim 6, further comprising a bridge circuit comprising the pairs of pressure sensors, the pressure sensors of each pair being connected in diagonally opposite branches of the bridge circuit, supply voltage terminals for the bridge circuit coupled across one bridge diagonal, and terminals for taking off a measured voltage for controlling the motor to limit the torque thereof coupled across the other bridge diagonal.

* * * * *